United States Patent
Kimura et al.

(10) Patent No.: US 12,032,467 B2
(45) Date of Patent: Jul. 9, 2024

(54) MONITORING SYSTEM, MONITORING METHOD, AND COMPUTER PROGRAM PRODUCT

(71) Applicants: Kabushiki Kaisha Toshiba, Minato-ku (JP); Kioxia Corporation, Minato-ku (JP)

(72) Inventors: Mitsuhiro Kimura, Fuchu (JP); Takahiro Takimoto, Yokahama (JP); Akira Sugimoto, Kawasaki (JP); Kosuke Haruki, Tachikawa (JP); Masahiro Ozawa, Yokahama (JP)

(73) Assignees: Kabushiki Kaisha Toshiba, Minato-ku (JP); Kioxia Corporation, Minato-ku (JP)

(*) Notice: Subject to any disclaimer, the term of this patent is extended or adjusted under 35 U.S.C. 154(b) by 736 days.

(21) Appl. No.: 16/542,420

(22) Filed: Aug. 16, 2019

(65) Prior Publication Data
US 2020/0226048 A1   Jul. 16, 2020

(30) Foreign Application Priority Data
Jan. 15, 2019   (JP) ................. 2019-004517

(51) Int. Cl.
*G06F 11/00* (2006.01)
*G06F 11/07* (2006.01)
(Continued)

(52) U.S. Cl.
CPC ...... *G06F 11/3452* (2013.01); *G06F 11/0766* (2013.01); *G06F 11/302* (2013.01);
(Continued)

(58) Field of Classification Search
CPC ............ G06F 11/0703; G06F 11/0751; G06F 11/0754; G06F 11/0766; G06F 11/0787;
(Continued)

(56) References Cited

U.S. PATENT DOCUMENTS

2007/0028219 A1*   2/2007   Miller ............... G05B 23/0275
                                                    717/124
2018/0218255 A1     8/2018   Ueno et al.
(Continued)

FOREIGN PATENT DOCUMENTS

JP    2003-132332 A    5/2003
JP    2018-119924 A    8/2018

OTHER PUBLICATIONS

Indre Zliobaite, "Change with Delayed Labeling: When is it Detectable?", 2010 IEEE International Conference on Data Mining Workshops [Online], IEEE, 2011, pp. 843-850, Internet: Retrieved on Oct. 20, 2022, URL: https://ieeexplore.ieee.org/abstract/document/5693384.

(Continued)

*Primary Examiner* — Joseph D Manoskey
(74) *Attorney, Agent, or Firm* — Oblon, McClelland, Maier & Neustadt, L.L.P.

(57) ABSTRACT

A monitoring system includes storage, and one or more processors. The storage stores at least one of first output data that is obtained from a learning model, or first statistical information that is obtained from the first output data. The processors calculate a degree of abnormality indicating a degree of change in statistical information of second output data with respect to the first statistical information, or a degree of change in the statistical information of the second output data with respect to second statistical information. The processors determine whether or not there is occurrence of an abnormality in the learning model, on the basis of the degree of abnormality. The processors output information indicating occurrence of the abnormality, in a case where occurrence of the abnormality is determined.

10 Claims, 7 Drawing Sheets

(51) Int. Cl.
*G06F 11/30* (2006.01)
*G06F 11/34* (2006.01)
*G06N 3/043* (2023.01)
*G06N 3/08* (2023.01)

(52) U.S. Cl.
CPC ......... *G06F 11/3065* (2013.01); *G06N 3/043* (2023.01); *G06N 3/08* (2013.01)

(58) Field of Classification Search
CPC .............. G06F 11/3003; G06F 11/302; G06F 11/3065; G06F 11/3447; G06F 11/3452; G06F 11/3466; G06F 11/3495; G06N 3/02; G06N 3/0436; G06N 3/08; G06N 20/00
See application file for complete search history.

(56) References Cited

U.S. PATENT DOCUMENTS

| | | | | |
|---|---|---|---|---|
| 2019/0012553 | A1* | 1/2019 | Maruchi | G06F 11/079 |
| 2020/0333777 | A1* | 10/2020 | Maruyama | G06N 7/01 |

OTHER PUBLICATIONS

Muto Shimako, "Introduction to Statistics Processing for an Administrative Dietitian, Dieticians", Kenpakusha, Mar. 1, 2012, pp. 87-94.

\* cited by examiner

MONITORING SYSTEM, MONITORING METHOD, AND COMPUTER PROGRAM PRODUCT

CROSS-REFERENCE TO RELATED APPLICATIONS

This application is based upon and claims the benefit of priority from Japanese Patent Application No. 2019-004517, filed on Jan. 15, 2019; the entire contents of which are incorporated herein by reference.

FIELD

Embodiments described herein relate generally to a monitoring system, a monitoring method, and a computer program product.

BACKGROUND

In the case of performing a process such as classification or estimation by inputting new data to a machine learning model learned by using past data, the machine learning model is sometimes not able to achieve expected accuracy because of a change in a trend of input data. When application is continued without such a reduction in accuracy being noticed, a user may possibly make an erroneous determination. It is not realistic to, for example, manually check reliability of output of the machine learning model to prevent such a situation, and a technology for detecting a change in a trend of input data as an abnormality is desired.

For example, there is proposed a technology for determining an abnormality when a machine learning model and a model created by another method are applied in parallel and there is a difference between outputs of the two models.

DETAILED DESCRIPTION

According to one embodiment, a monitoring system includes storage, and one or more processors. The storage stores at least one of first output data that is obtained from a learning model, or first statistical information that is obtained from the first output data. The processors calculate a degree of abnormality indicating a degree of change in statistical information of second output data with respect to the first statistical information, or a degree of change in the statistical information of the second output data with respect to second statistical information. The processors determine whether or not there is occurrence of an abnormality in the learning model, on the basis of the degree of abnormality. The processors output information indicating occurrence of the abnormality, in a case where occurrence of the abnormality is determined.

Hereinafter, preferred embodiments of a monitoring system according to the invention will be described in detail with reference to the appended drawings.

First Embodiment

As described above, accuracy of output of a model learned by machine learning (hereinafter referred to as a learning model) is sometimes reduced by a change in a trend of input data. In such a case, to apply a learning model, it is important to detect the change in the trend of input data and to remove cause of the change, to correct the learning model such that the learning model functions with high accuracy also with the changed input data, and to handle an output obtained at this time with care, for example.

With a technology as described above that uses two models, an abnormality cannot be detected in a case where performance degradation occurs simultaneously in the two models. Furthermore, to realize high accuracy by a system as a whole, accuracy has to be high for all the models. However, creating a plurality of highly accurate models increases a processing load, and the cost is possibly increased.

A monitoring system according to a first embodiment detects an abnormality in a learning model by storing output data of a learning model corresponding to input data that is input in a reference period or statistical information of the output data (statistics), and by comparing statistical information of output data of the learning model corresponding to later input data and the statistical information that is obtained from stored data. This allows a change in a trend of the input data to be grasped and an abnormality in the learning model to be detected with high accuracy by a simple configuration.

Figure 1:
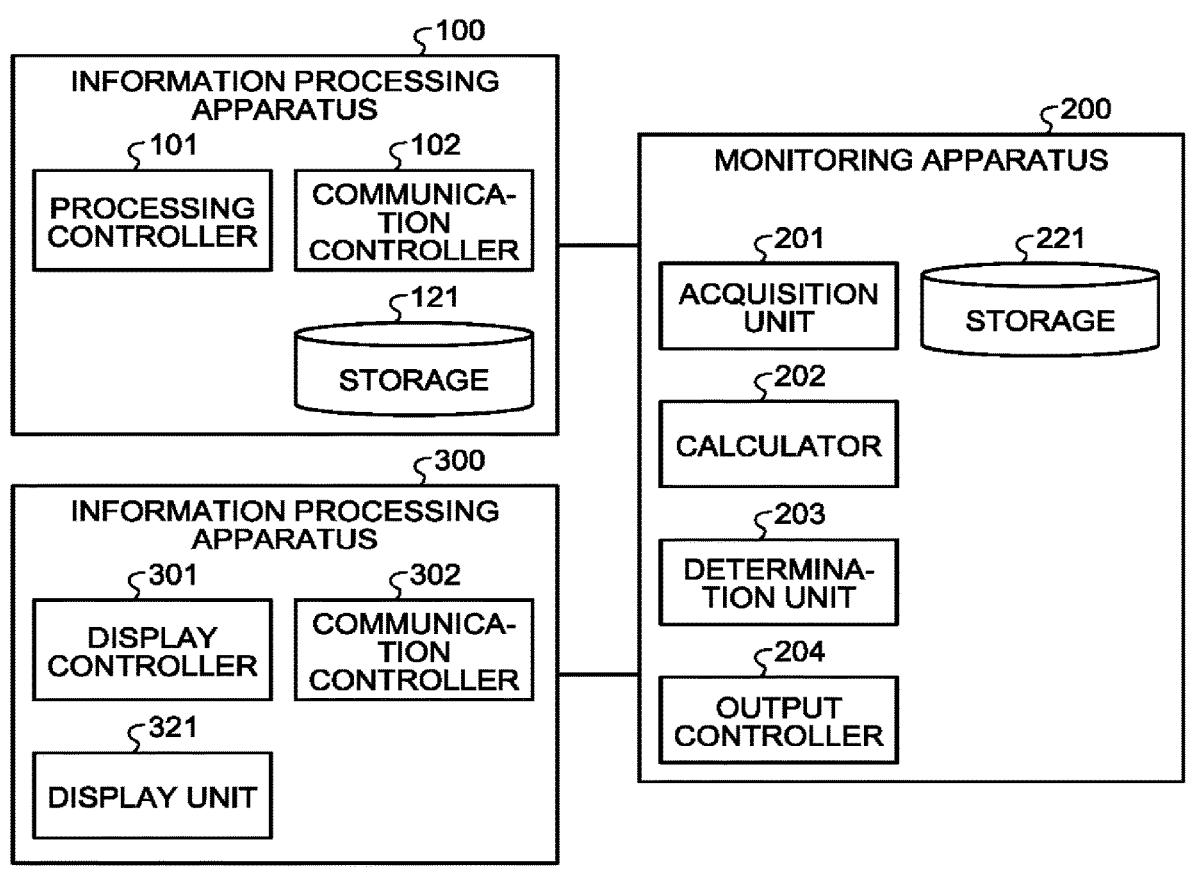
FIG. 1 is a block diagram of a monitoring system according to a first embodiment.

FIG. 1 is a block diagram illustrating an example configuration of the monitoring system according to the first embodiment. As illustrated in FIG. 1, the monitoring system of the first embodiment includes an information processing apparatus 100, a monitoring apparatus 200, and an information processing apparatus 300.

The information processing apparatus 100, the monitoring apparatus 200, and the information processing apparatus 300 are connected by an arbitrary connection mode such as by a network such as a local area network (LAN) and the Internet, or by a connection cable.

The information processing apparatus 100 is an apparatus that performs learning of a learning model, processing using a learning model that is already learned, and the like. The learning model may be any model, and is a neural network, a support vector machine (SVM), a decision tree, a random forest, or a gradient boosting decision tree (GBDT), for example.

The information processing apparatus 100 includes a processing controller 101, a communication controller 102, and storage 121.

The storage 121 stores various pieces of information that are used in various types of processes that are performed by the information processing apparatus 100. For example, the storage 121 stores information determining a learning model (for example, in the case of a neural network, parameters such as a weight and a bias), learning data to be used for learning, and verification data to be used for verification of a learning model.

The processing controller 101 controls learning of a learning model. The processing controller 101 controls a learning process by a learning method according to a learning model that is applied. For example, in the case of using a neural network as the learning model, the processing controller 101 performs a learning process by a learning method such as backpropagation.

The processing controller 101 also controls a process performed using a learning model that is already learned. The process performed using a learning model may be any process, and for example, the process is a classification process classifying input data into any of a plurality of classes or an estimation process of estimating a certain value from input data. For example, the processing controller 101 inputs input data that is a processing target into a learning model that is already learned, and obtains output data from the learning model. The input data may be acquired by any method. For example, the input data may be acquired through the communication controller 102 described later.

The communication controller 102 controls communication performed with an external apparatus such as the monitoring apparatus 200. For example, the communication controller 102 transmits, to the monitoring apparatus 200, information determining a learning model that is already learned, and output data output from the learning model.

Each unit described above (the processing controller 101 and the communication controller 102) is implemented by one or more processors, for example. Each unit described above may be implemented by causing a processor such as a central processing unit (CPU) to execute a program, or in other words, by software, for example. Each unit described above may alternatively be implemented by a processor such as a dedicated integrated circuit (IC), or in other words, by hardware. Each unit described above may alternatively be implemented by a combination of software and hardware. In the case of using a plurality of processors, each processor may implement one of the units, or two or more of the units.

Next, a description will be given of the monitoring apparatus 200. The monitoring apparatus 200 is an apparatus that monitors a process performed using a learning model that is already learned. The monitoring apparatus 200 includes an acquisition unit 201, a calculator 202, a determination unit 203, an output controller 204, and storage 221.

The storage 221 stores various pieces of information that are used in various types of processes that are performed by the monitoring apparatus 200. For example, the storage 221 stores reference information that is referred to at the time of the determination unit 203, described later, determining an abnormality in a learning model. The reference information is at least one of statistical information (first statistical information) of a plurality of pieces of output data (first output data) that are obtained by inputting input data (first input data) that is input in the reference period in a learning model that is learned, and information that is used to calculate the statistical information of the plurality of pieces of output data. The information that is used to calculate the statistical information is the plurality of pieces of output data themselves, for example.

In the case where the storage 221 stores the output data itself, the calculator 202, described later, calculates statistical information (first statistical information) of the output data by using the stored output data, and further uses the calculated statistical information for calculation of a degree of abnormality, for example. In a case where update frequency of the output data is low, a load of a calculation process may be more reduced by storing the statistical information calculated from the output data in the storage 221, and by using the statistical information to calculate the degree of abnormality or the like.

The input data that is input in the reference period is input data that is input in a state where a learning model is functioning normally, for example. For example, a normal function state is a state of functioning with the same or higher accuracy as accuracy that is checked at the time of determination of application of the learning model. Application or no application is determined by checking performance by verification data different from learning data, for example. Accordingly, the accuracy that is checked at the time of determination of application of the learning model is accuracy of the verification data at the time of determining application.

Additionally, the input data that is input in the reference period is not limited to the input data that is input in a state where the learning model is functioning normally. That is, the reference period is not limited to a period corresponding to a state where the learning model is functioning normally, but may be any period. For example, a period may take a specific period in the past as a reference, and reference information for the input data that is input in such a period may be used. In this case, output data (second output data) that is a target of comparison with the reference information may be output data that is output in a period following the specific period in the past.

Furthermore, the storage 221 stores a plurality of pieces of output data (second output data) that are output data acquired by the acquisition unit 201, and that correspond to input data (second input data) that is input after the first input data.

The storage 221 may include a plurality of physically or logically divided storage units. For example, division into storage that stores the reference information and storage that stores output data acquired by the acquisition unit 201 is conceivable.

An example of the statistical information will now be described. When a plurality of pieces of output data are given as $(v_1, v_2, \ldots, v_n)$ (n is an integer of two or more), the statistical information is an arithmetic mean u that is calculated by Formula (1), or a standard deviation $\sigma$ that is calculated by Formula (2), for example.

$$u = \frac{1}{n}\sum_{i=1}^{n} v_i \quad (1)$$

$$\sigma = \sqrt{\frac{1}{n}\sum_{i=1}^{n} (v_i - u)^2} \quad (2)$$

The statistical information is not limited to Formula (1) and Formula (2), and other statistical information such as a median value or a variance may also be used, for example.

The acquisition unit 201 acquires a plurality of pieces of output data (second output data) that are obtained by inputting, in the learning model, input data (second input data) that is input after input data (first input data) corresponding to the reference information. For example, the acquisition unit 201 acquires the output data that is transmitted from the information processing apparatus 100. Any method may be used as an acquisition method for output data. For example, the acquisition unit 201 may acquire the output data every time the information processing apparatus 100 performs a process using the learning model, or may acquire, from the information processing apparatus 100, a specific number of pieces of output data when the specific number of pieces of output data are obtained in the information processing apparatus 100, or may acquire, from the information processing apparatus 100, the output data that is obtained in a specific period every time the period elapses. The acquisition unit 201 stores the acquired output data in the storage 221.

The output data is different depending on the learning model that is monitored. For example, in the case where the learning model performs multi-class classification, the output data is a log it or a probability value (posterior probability) for each class. For example, in the case where the learning model is to estimate a certain value, the output data is an estimated value that is estimated. For example, in the case where the learning model performs reconstruction of an input, and detects an abnormality on the basis of a size of a reconstruction error, the output data is a value of the reconstruction error.

The calculator 202 calculates a degree of abnormality indicating a degree of change in the statistical information of the output data (second output data) acquired by the acquisition unit 201, with respect to the statistical information of a plurality of pieces of output data (first output data) that are obtained on the basis of the reference information. As described above, the reference information is the output data itself, or the statistical information of a plurality of pieces of output data. In the following, description is mainly given assuming that the statistical information of a plurality of pieces of output data is calculated, but it is also possible to calculate statistical information (second statistical information) of a mean value or the like by using a plurality of pieces of statistical information of the output data. For example, a mean value of the statistical information from an initial state may be further calculated by using all the mean values that are stored in the storage 221. By comparing a mean value from the initial state to a processing time point and a mean value at the processing time point, a change in a state from the initial state may be grasped.

Additionally, the pieces of output data acquired by the acquisition unit 201 are, in many cases, varied to a certain extent even when the learning model is functioning normally. Accordingly, the statistical information of the acquired output data is used, instead of one piece of output data, for comparison with the statistical information that is stored in the storage 221. This enables an influence of a variance of each piece of output data to be suppressed.

First, the calculator 202 reads out a plurality of pieces of output data that are acquired by the acquisition unit 201 and stored in the storage 221, and calculates the statistical information of the read-out output data. The statistical information that is calculated by the calculator 202 is an arithmetic mean, for example. When the output data that is acquired by the acquisition unit 201 is given as $x_0$, and the output data that is previously acquired and that is stored in the storage 221 is given as $(x_1, x_2, \ldots, x_n)$, the calculator 202 calculates an arithmetic mean m by Formula (3) below, for example. Additionally, the number of pieces of output data that are stored is given as n, which is the same as the number of pieces of output data used for calculation of the statistical information, but the numbers of pieces may take different values.

$$m = \frac{1}{n+1} \sum_{i=0}^{n} x_i \tag{3}$$

Using such statistical information may prevent an abnormality from being determined where there is actually no abnormality, because of the degree of abnormality being increased due to the variance in the acquired output data. Size and properties of variance that can be suppressed by using the statistical information are different depending on the number of pieces of output data stored in the storage 221 and a calculation method of the statistical information. Accordingly, the number of pieces of output data to be stored in the storage 221 may be adjusted according to the calculation method of the statistical information and the required size and properties of the variance, for example.

Next, the calculator 202 compares the calculated statistical information and the statistical information that is obtained from the reference information that is stored in the storage 221, and calculates a degree of abnormality indicating a degree of temporal change in the output data of the learning model. For example, the calculator 202 calculates a Mahalanobis Distance expressed by Formula (4) below, as a degree of abnormality d.

$$d = \frac{m-u}{\sigma} \tag{4}$$

A calculation method of the degree of abnormality is not limited to Formula (4). For example, the calculator 202 may calculate a distance (such as a Euclidean distance) between pieces of output data as the degree of abnormality.

In the case where the output data is expressed by a vector including a plurality of elements, calculation by each formula described above may be performed by using one element among the plurality of elements. For example, in the case where the learning model is a multi-class classification model, and a posterior probability vector is output as the output data, calculation by each formula described above is performed using an element with the largest value (posterior probability).

In the case where the output data is expressed by a vector including a plurality of elements, a distance between the vectors may be calculated. For example, the storage 221 stores, as the reference information, a vector u that takes, as an element, a mean value of each element of a plurality of pieces of output data (vectors) corresponding to the input data that is input in the reference period. Furthermore, the calculator 202 calculates a vector m that takes, as an element, a mean value of each element of the plurality of pieces of output data (vectors) acquired by the acquisition unit 201 and stored in the storage 221. Then, the calculator 202 calculates, as the degree of abnormality d, a Mahalanobis Distance that is expressed by Formula (5) below, by using the vector m, the vector u, and a covariance matrix $\Sigma$.

$$d = \sqrt{(m-u)^T \Sigma^{-1} (m-u)} \tag{5}$$

The determination unit 20 determines whether an abnormality is caused in the learning model, on the basis of the degree of abnormality calculated by the calculator 202. For example, the determination unit 203 compares the calculated degree of abnormality and a threshold that is determined in advance, and determines there is occurrence of an abnormality in the learning model, in the case where the threshold is exceeded by the degree of abnormality. The threshold used for comparison is a constant number such as one, for example. When the threshold is reduced, a small change is determined as an abnormality. When the threshold is increased, an abnormality is determined only when there is a great change. Accordingly, in a case where a reduction in accuracy poses a great risk, and a small reduction in accuracy should not be overlooked, the threshold is reduced. In a case where a reduction in accuracy poses a small risk and may be overlooked to some degree, or in a case where, even when a reduction in accuracy is found, such a situation cannot be handled swiftly, the threshold is increased. In this manner, the threshold may be adjusted according to the properties and an application method of the learning model that is monitored.

In the case where occurrence of an abnormality is determined, the output controller 204 outputs information indicating occurrence of an abnormality. For example, the output controller 204 transmits, to the information processing apparatus 300 or the like, display information including information indicating occurrence of an abnormality in the learning model to be displayed on a display device or the like. The output controller 204 may output that there is occurrence of an abnormality, to an output device such as a display device (such as a liquid crystal display), an audio output device (such as a speaker), or a warning indicator light that is provided in the monitoring apparatus 200 or connected to the monitoring apparatus 200.

Each unit described above (the acquisition unit 201, the calculator 202, the determination unit 203, and the output controller 204) is implemented by one or more processors. For example, each unit described above may be implemented by execution of a program by a processor such as a CPU, or in other words, by software. Each unit described above may alternatively be implemented by a processor such as a dedicated IC, or in other words, by hardware. Each unit described above may alternatively be implemented by a combination of software and hardware. In the case where a plurality of processors are used, each processor may implement one of the units, or two or more of the units.

Next, a description will be given of the information processing apparatus 300. For example, the information processing apparatus 300 is an apparatus that performs output (display) and the like of information that is transmitted from the monitoring apparatus 200. The information processing apparatus 300 includes a display controller 301, a communication controller 302, and a display unit 321.

The display unit 321 is a device for displaying information, and includes a liquid crystal display, for example.

The communication controller 302 controls communication that is performed with an external apparatus such as the monitoring apparatus 200. For example, the communication controller 302 receives, from the monitoring apparatus 200, display information including information indicating occurrence of an abnormality in the learning model.

The display controller 301 controls display of information on the display unit 321. For example, the display controller 301 causes the display unit 321 to display the display information that is received from the monitoring apparatus 200.

Each unit described above (the display controller 301 and the communication controller 302) is implemented by one or more processors. For example, each unit described above may be implemented by execution of a program by a processor such as a CPU, or in other words, by software. Each unit described above may alternatively be implemented by a processor such as a dedicated IC, or in other words, by hardware. Each unit described above may alternatively be implemented by a combination of software and hardware. In the case where a plurality of processors are used, each processor may implement one of the units, or two or more of the units.

Additionally, each storage described above (the storage 121, the storage 221) may be any storage medium that is generally used, such as a flash memory, a memory card, a random access memory (RAM), a hard disk drive (HDD), or an optical disk.

A configuration of the monitoring system illustrated in FIG. 1 is exemplary, and is not restrictive. For example, the information processing apparatus 100, the monitoring apparatus 200, and the information processing apparatus 300 do not have to be physically independent apparatuses, and may be partially or wholly physically integrated into one apparatus. Furthermore, for example, at least one of the information processing apparatus 100 or the monitoring apparatus 200 may be implemented as a server apparatus that performs processes in a cloud environment.

Figure 2:
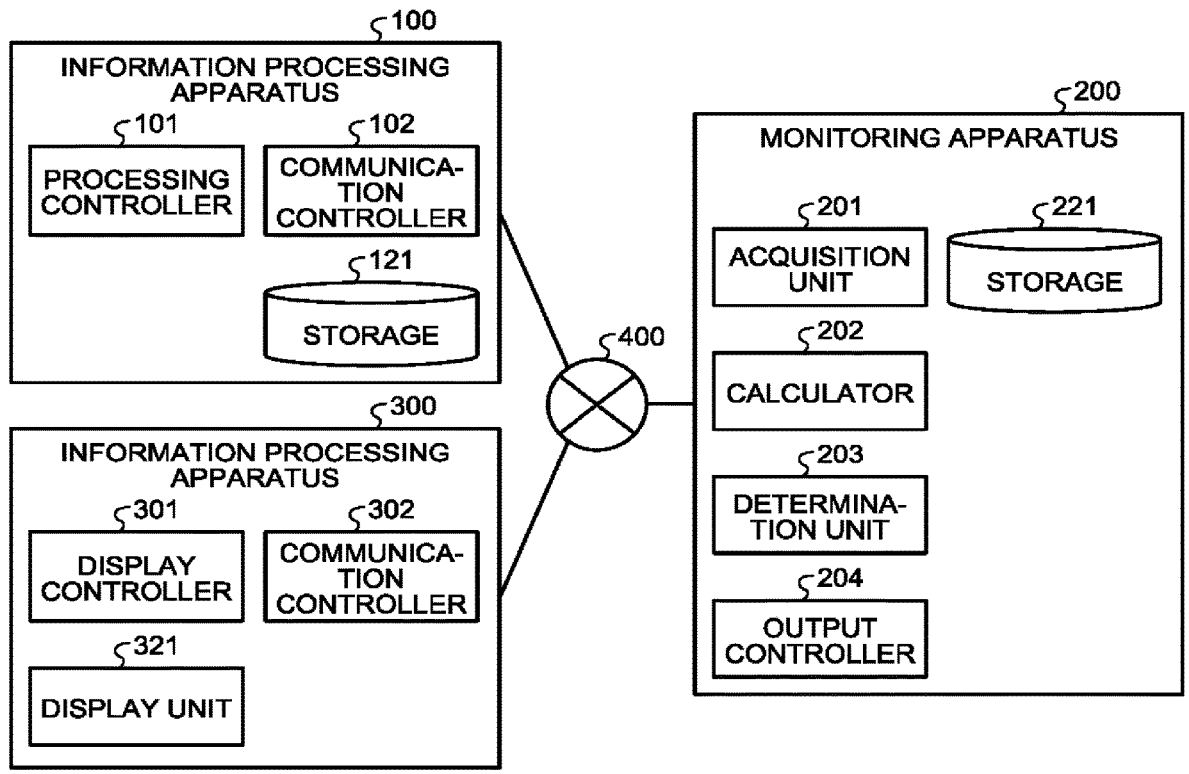
FIG. 2 is a block diagram of the monitoring system according to the first embodiment.

FIG. 2 is a block diagram illustrating an example configuration for a case where the monitoring system is implemented in a cloud environment. As illustrated in FIG. 2, each apparatus is connected by a network 400 such as the Internet. For example, the monitoring apparatus 200 may be implemented as a server apparatus, in the cloud environment, that can be accessed through the network 400.

Figure 3:
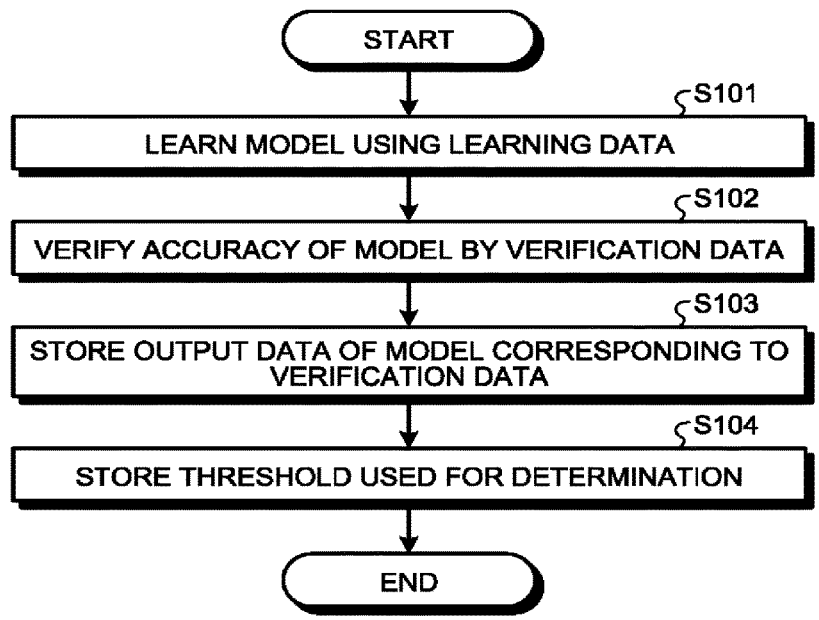
FIG. 3 is a flowchart of a learning process according to the first embodiment.

Next, a learning process by the monitoring system according to the first embodiment having a configuration as described above will be described. The learning process is a process for learning a learning model that is a monitoring target. FIG. 3 is a flowchart illustrating an example of the learning process according to the first embodiment.

The processing controller 101 of the information processing apparatus 100 learns a learning model by using learning data (step S101). The processing controller 101 further verifies accuracy of the learning model that is learned, by using verification data (step S102). In the case where accuracy is not verified by the verification data (such as in a case where it is determined that the learning model cannot be applied), learning may be performed using another piece of learning data or the like by returning to step S101.

In the case where accuracy is verified by the verification data, the processing controller 101 transmits output data of the learning model corresponding to the verification data to the monitoring apparatus 200 through the communication controller 102, for example. The monitoring apparatus 200 stores, in the storage 221, the output data that has been transmitted, or statistical information (such as the arithmetic mean u or the standard deviation σ) of the output data that has been transmitted, as the reference information (step S103). Furthermore, the monitoring apparatus 200 stores the threshold to be used by the determination unit 203 to determine an abnormality, in the storage 221, for example (step S104). The threshold to be stored may be a value specified by a user who uses the monitoring apparatus 200, or may be a value that is transmitted from the information processing apparatus 100, for example.

Figure 4:
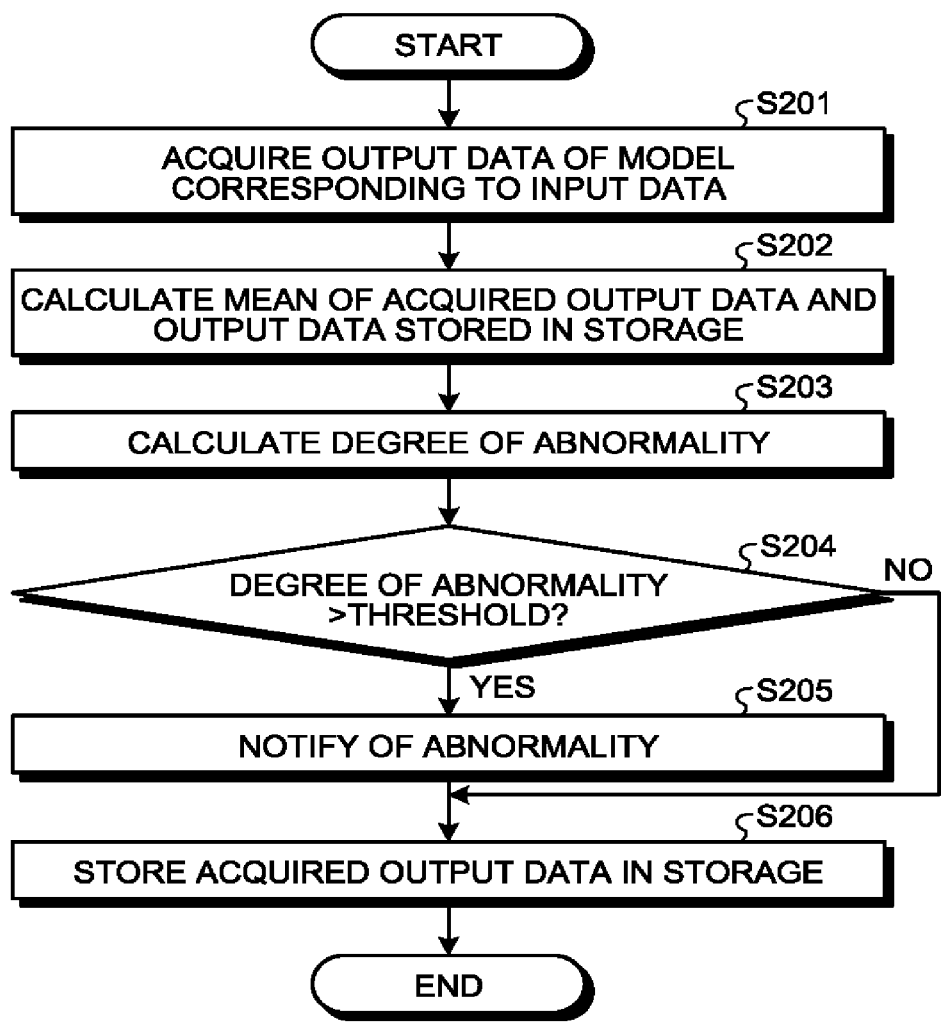
FIG. 4 is a flowchart of a monitoring process according to the first embodiment.

Next, a monitoring process by the monitoring system according to the first embodiment will be described. The monitoring process is a process for monitoring an abnormality at the time of application of a learning model by using a result (output data) of a process performed using a learning model learned by the learning process, for example. FIG. 4 is a flowchart illustrating an example of the monitoring process according to the first embodiment.

The acquisition unit 201 acquires output data of a learning model corresponding to input data at the time of application from the information processing apparatus 100 (step S201). The calculator 202 calculates statistical information (the arithmetic mean m) of the acquired output data and a plurality of pieces of output data previously acquired and stored in the storage 221 (step S202).

The calculator 202 calculates the degree of abnormality by Formula (4) described above, for example, by using the calculated statistical information (such as the arithmetic mean m) and the statistical information (such as the arithmetic mean u or the standard deviation σ) that is stored in advance in the storage 221 (step S203).

The determination unit 203 determines whether or not the calculated degree of abnormality exceeds the threshold (step S204). In the case where the threshold is exceeded (step S204: Yes), the output controller 204 transmits (issues), to the information processing apparatus 300, the display information including information indicating occurrence of an abnormality in the learning model (step S205).

When the degree of abnormality does not exceed the threshold (step S204: No), and after a notification regarding the abnormality is issued, the acquisition unit 201 stores the acquired output data in the storage 221 (step S206). At this time, the acquisition unit 201 may delete oldest output data in the storage 221. This allows only the number of pieces of output data necessary to calculate the statistical information to be stored in the storage 221.

Additionally, in the example in FIG. 4, the degree of abnormality is calculated and determination is performed regarding an abnormality, every time one piece of output data is acquired by the acquisition unit 201. Calculation of the degree of abnormality, abnormality determination, and the like may be performed every time the acquisition unit 201 acquires a predetermined number of pieces of output data, or every time a predetermined period elapses.

As described above, with the monitoring system according to the first embodiment, an abnormality in a learning model is detected by comparing a plurality of pieces of output data of a learning model corresponding to input data input in the reference period or the statistical information of the plurality of pieces of output data, with output data of the learning model corresponding to later input data or the statistical information of the output data. An abnormality in the learning model may thereby be detected with high accuracy.

Second Embodiment

Figure 5:
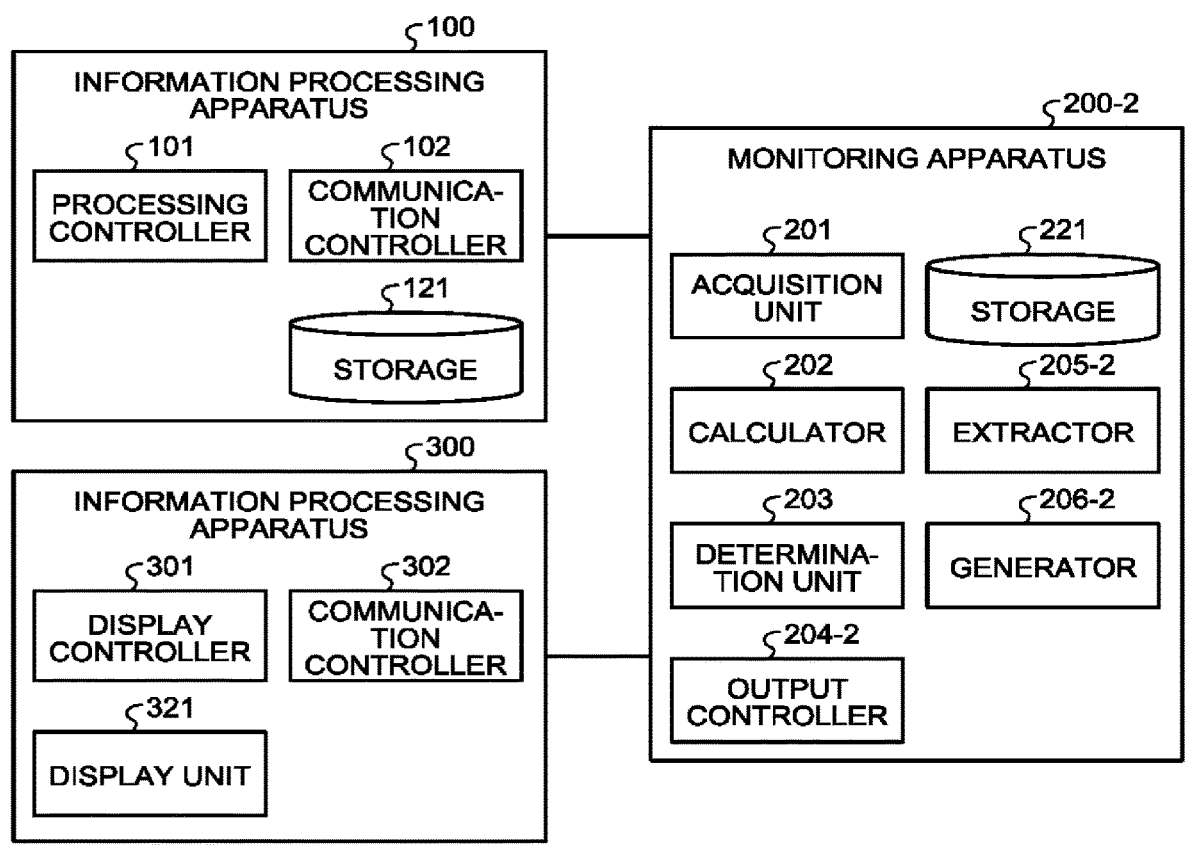
FIG. 5 is a block diagram of a monitoring system according to a second embodiment.

A monitoring system according to a second embodiment outputs information indicating cause of an abnormality in the case where occurrence of an abnormality is determined. FIG. 5 is a block diagram illustrating an example configuration of the monitoring system according to the second embodiment. As illustrated in FIG. 5, the monitoring system according to the second embodiment includes the information processing apparatus 100, a monitoring apparatus 200-2, and the information processing apparatus 300.

The second embodiment is different from the first embodiment in that an extractor 205-2 and a generator 206-2 are further provided in the monitoring apparatus 200-2, and with respect to a function of an output controller 204-2. Other configurations and functions are the same as those in FIG. 1, which is a block diagram of the monitoring system according to the first embodiment, and a description thereof is omitted by assigning same reference signs.

In the case where occurrence of an abnormality is determined, the extractor 205-2 extracts, as abnormal data, output data that is the cause of the abnormality, from a plurality of pieces of output data acquired by the acquisition unit 201 (including output data acquired by the acquisition unit 201 and stored in the storage 221 in the past). For example, the extractor 205-2 extracts output data x satisfying Formula (6) below as the abnormal data. The output data x is any of output data $x_0$ acquired by the acquisition unit 201 and output data $(x_1, x_2, \ldots, x_n)$ stored in the storage 221. Values stored in the storage 221 may be used as the arithmetic mean u and the standard deviation σ. t is a constant number that is determined in advance, and takes a same value (such as one) as the threshold used for determination of an abnormality, for example.

$$\frac{x-u}{\sigma} > t \qquad (6)$$

By the process as described above, the extractor 205-2 may extract output data that is determined to be abnormal as the abnormal data, when the degree of abnormality is calculated by using each piece of output data instead of the statistical information.

The extraction method of the abnormal data by the extractor 205-2 is not limited to the method described above. For example, a method of extracting N pieces (where N is an integer of one or more) in a descending order of the degree of abnormality may also be used.

Furthermore, the extractor 205-2 acquires input data corresponding to the extracted output data. For example, the acquisition unit 201 acquires, together with the output data, input data corresponding to the output data from the information processing apparatus 100, and stores the same in the storage 221 in association with the output data. The extractor 205-2 may acquire the input data corresponding to the output data from the storage 221.

The generator 206-2 generates information (internal information) indicating how the input data corresponding to the extracted output data was processed inside the learning model. The generator 206-2 generates internal information according to the learning model that is applied.

For example, in the case where the learning model is a convolutional neural network (CNN), the generator 206-2 generates a saliency map or the like as the internal information. In the case where the learning model is a decision tree, the generator 206-2 generates a path to a determined leaf or the like as the internal information. In the case where the learning model is a random forest, the generator 206-2 generates the number of trees that voted a result close to the output data, as the internal information, for example. In the case where other classification models are used, the generator 206-2 may generate information visualizing a relationship between a boundary between classification classes and the abnormal data, as the internal information.

The acquisition unit 201 may acquire, from the information processing apparatus 100, information that is necessary for the generator 206-2 to generate the internal information, together with the output data, and store the information in the storage 221.

The output controller 204-2 is different from the output controller 204 of the first embodiment in further including a function for outputting the (generated internal information. For example, in the case where occurrence of an abnormality is determined, the output controller 204-2 transmits, to the information processing apparatus 300, display information for displaying the output data and the corresponding input data extracted by the extractor 205-2 and the internal information generated by the generator 206-2.

Figure 6:
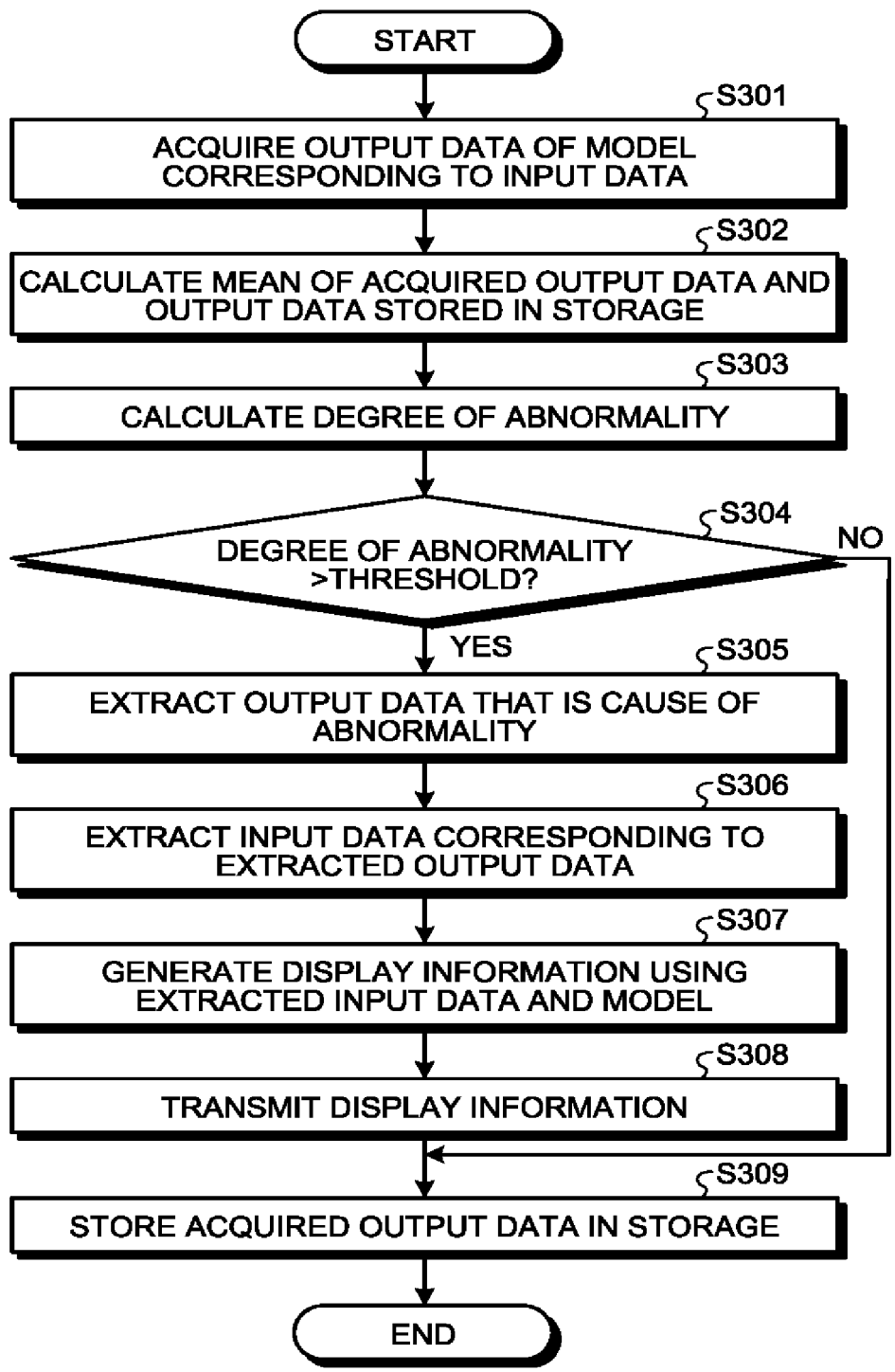
FIG. 6 is a flowchart of a monitoring process according to the second embodiment.

Next, a monitoring process by the monitoring system according to the second embodiment having a configuration as described above will described with reference to FIG. 6. FIG. 6 is a flowchart illustrating an example of the monitoring process according to the second embodiment.

Step S301 to step S304 are the same processes as step S201 to step S204 of the monitoring system according to the first embodiment, and a description thereof will be omitted.

In the case where the degree of abnormality exceeds the threshold (step S304: Yes), the extractor 205-2 extracts output data that is the cause of the abnormality (step S305). For example, the extractor 205-2 extracts the output data x satisfying Formula (6) described above as the abnormal data. The extractor 205-2 extracts, from the storage 221, for example, input data corresponding to the extracted output data (abnormal data) (step S306).

The generator 206-2 generates, using the extracted input data, display information including internal information indicating how the input data was processed inside the learning model (step S307). For example, the generator 206-2 inputs the input data in the learning model and performs process, acquires internal information at the time of execution, and generates display information including the acquired internal information. The output controller 204-2 transmits the generated display information to the information processing apparatus 300 (step S308).

When the degree of abnormality does not exceed the threshold (step S304: No), and after the display information is transmitted, the acquisition unit 201 stores the acquired output data in the storage 221 (step S309).

Figure 7:
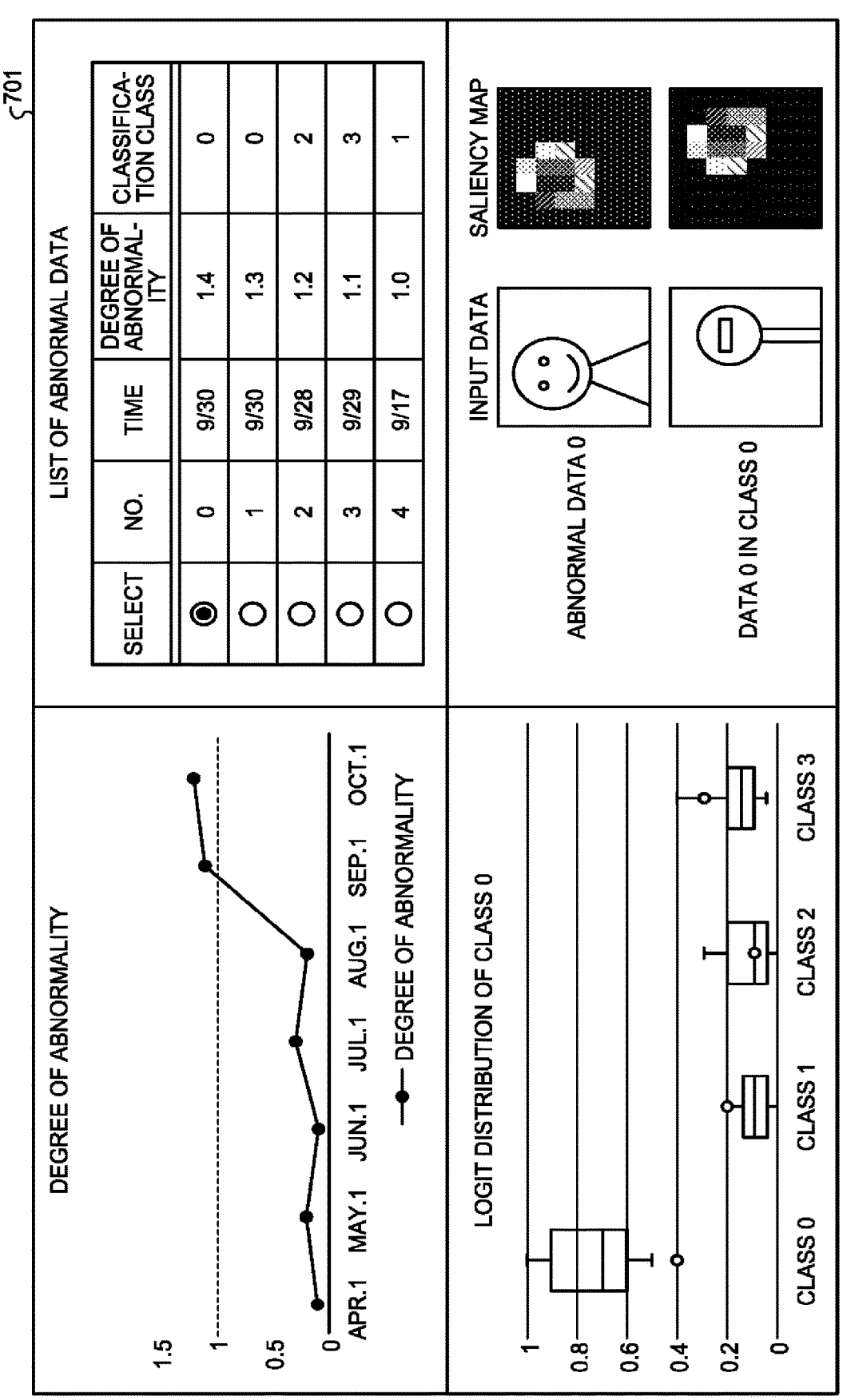
FIG. 7 is a diagram illustrating an example of a display screen that is based on display information.

Next, an example of a display screen that is based on the display information will be described with reference to FIGS. 7 and 8. FIG. 7 is a diagram illustrating an example of a display screen 701 that is displayed on the basis of the display information.

FIG. 7 illustrates an example of e display screen 701 where the learning model is a convolutional neural network that classifies an input image (an example of input data) into one of a plurality of classes. An upper left part of the display screen 701 is a graph indicating a transition of the degree of abnormality calculated by the calculator 202 up to a display time point. Such a graph allows grasping of period when there is an increase in the abnormal data, or in other words, a period when the accuracy of the learning model is reduced. Furthermore, a value of the degree of abnormality is displayed, and thus, the level of abnormality may be grasped. Such information may be used as a reference at the time of investigating the cause of an abnormality, and of determining the degree of priority of handling the abnormality, for example.

An upper right part of the display screen 701 shows a list of abnormal data (log it) extracted by the extractor 205-2. This list includes a number for identifying the abnormal data, the processed time (day, time, etc.), the class into which the data is classified, and the like. The list may be sorted and displayed in the descending order from the highest degree of abnormality or in a time order, for example. Specification of a range (such as a period) of abnormal data that is made a target of display in the list may be allowed.

When a user selects one piece of abnormal data from a plurality of pieces of abnormal data included in the list, for example, the internal information about the selected abnormal data and the like are displayed. For example, a lower left part of the display screen 701 shows, for a class into which the selected abnormality data is classified (in the example in FIG. 7, a class 0), a distribution of a plurality of pieces of output data (log its) classified into the class. For example, the storage 221 stores, together with a classification class, output data for when the learning model is functioning normally. The generator 206-2 generates the distribution as illustrated in FIG. 7 by referring to the information stored in the storage 221.

Rectangular portions in the distribution indicate values of log its included in a first range that is determined in advance. The first range is a range that is determined as a range including a large number of pieces of output data, and is a range corresponding to 25% to 75% of the values of all the log its, for example. Vertical lines attached above and below the rectangle indicate values of log its included in a second range different from the first range. A horizontal line inside the rectangular portion indicates a median value or a mean value of the log its, for example. A white circle indicates the value of a log it corresponding to the selected abnormal data. In FIG. 7, the abnormal data is classified into the class 0, but is indicated to take a value that is greatly offset from the first range of the class 0.

Detailed information of the abnormal data, a basis for calculation of the degree of abnormality, and the like may be grasped from the information on the lower left portion of the display screen 701.

An example of internal information generated by the generator 206-2 for the selected abnormal data is illustrated at a lower right portion of the display screen 701. In the example in FIG. 7, a saliency map is displayed as the internal information for the selected abnormal data. Corresponding input data (image) is displayed next to the saliency map. This enables the cause of determination of the abnormality to be more easily grasped, thereby providing a reference for considering a method of correcting the learning model, for example.

Additionally, FIG. 7 illustrates an example where, when an image of a person is input as the input data, classification into the class 0, which is a class indicating a sign, is performed, and thus, the output data corresponding to the input data is determined to be abnormal data. By displaying an image of the input data in addition to the saliency map, it may be estimated that input of an image of a person as the input data is the cause of abnormality, for example.

Moreover, in FIG. 7, an example of input data that is input in a normally functioning state and a saliency map for the input data are displayed below the abnormal data. It may be estimated that the face of a person is erroneously recognized by the learning model to be a sign, for example, by comparing the saliency map mentioned above with the saliency map for the abnormal data.

Figure 8:
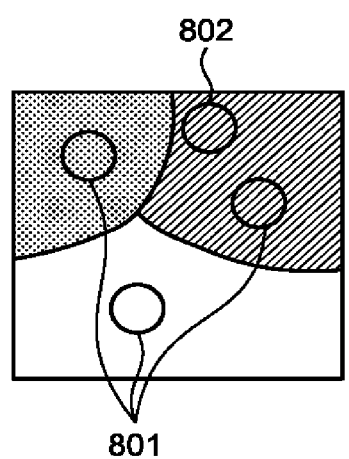
FIG. 8 is a diagram illustrating another example of the display screen that is based on the display information.

FIG. 8 is a diagram illustrating another example of the display screen that is based on the display information. FIG. 8 illustrates an example of the display screen for a case where the generator 206-2 generates, as the internal information, information visualizing a relationship between a boundary between classification classes and the abnormal data. As illustrated in FIG. 8, the display screen includes boundaries of three classification classes, and output data. Output data 801 indicates output data corresponding to input data that is input in a normally functioning state. Output data 802 indicates output data that is extracted as abnormal data. It can be grasped from the display screen illustrated in FIG. 8 that the output data 802 that is the abnormal data is distributed near the boundary between the classes.

As described above, with the monitoring system according to the second embodiment, in the case where occurrence of an abnormality is determined, information indicating the cause of the abnormality and the like may be output.

As described above, according to the first and second embodiments, an abnormality may be detected with high accuracy at the time of application of a learning model that is learned by machine learning.

Figure 9:
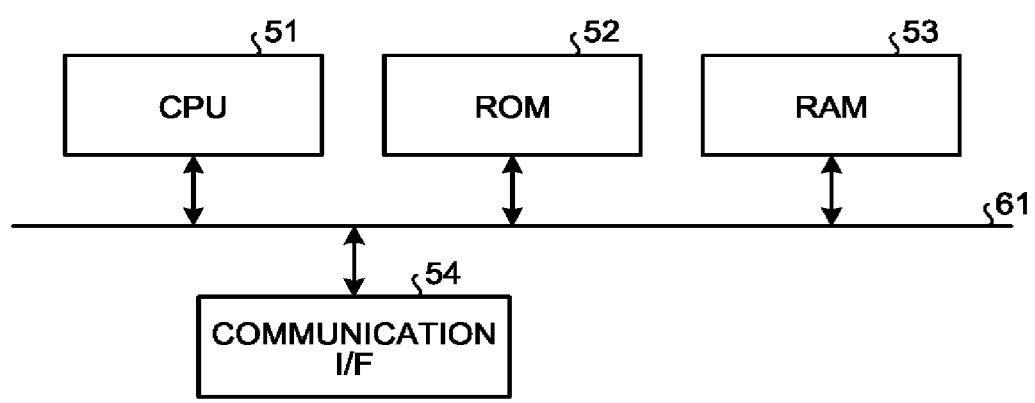
FIG. 9 is a hardware configuration diagram of an apparatus according to the first or second embodiment.

Next, a hardware configuration of each apparatus (the information processing apparatus, the monitoring apparatus) according to the first or second embodiment will be described with reference to FIG. 9. FIG. 9 is an explanatory diagram illustrating an example hardware configuration of an apparatus according to the first or second embodiment.

An apparatus according to the first or second embodiment includes a control device such as a CPU 51, storage devices such as a read only memory (ROM) 52 and a RAM 53, a communication I/F 54 that performs communication by connecting to a network, and a bus 61 connecting each unit.

A program that is executed by an apparatus according to the first or second embodiment is provided by being built in the ROM 52 or the like in advance.

A program that is executed by an apparatus according to the first or second embodiment may be provided as a computer program product by being recorded in a computer-readable recording medium such as compact disk read only memory (CD-ROM), a flexible disk (FD), a compact disk recordable (CD-R), or a digital versatile disk (DVD), as a file in an installable format or an executable format.

Furthermore, a program that is executed by an apparatus according to the first or second embodiment may be stored in a computer that is connected to a network, such as the Internet, and be provided by being downloaded through the network. Moreover, a program that is executed by an apparatus according to the first or second embodiment may be provided or distributed through a network, such as the Internet.

A program that is executed by an apparatus according to the first or second embodiment enables a computer to function as each unit of the apparatus as described above. The CPU 51 of the computer may read out the program from a computer-readable storage medium into a main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitoring system comprising:
    storage configured to store at least a plurality of pieces of first output data that are obtained by inputting first input data in a learning model that is learned, or first statistical information that is obtained from the plurality of pieces of first output data;
    one or more processors configured to:
        train the learning model using the first input data using backpropagation;
        acquire a plurality of pieces of second output data that are obtained by inputting second input data in the learning model;
        calculate a degree of abnormality indicating at least one of a degree of change in second statistical information that is obtained from the plurality of pieces of second output data with respect to the first statistical information, or another degree of change in the second statistical information with respect to third statistical information that is calculated from a plurality of pieces of fourth statistical information including the first statistical information;
        determine whether or not there is an occurrence of an abnormality in the learning model, based on the degree of abnormality;
        output information indicating the occurrence of the abnormality, in a case where the occurrence of the abnormality is determined;
        extract, in a case where the occurrence of the abnormality is determined, abnormal data that is at least one piece of the plurality of pieces of second output data that is a cause of the abnormality, among the plurality of pieces of second output data; and
        output internal information indicating how the abnormal data is processed inside the learning model, the internal information including information visualizing a relationship between a boundary between classification classes and the abnormal data.

2. The monitoring system according to claim 1, wherein the learning model is a neural network.

3. The monitoring system according to claim 2, wherein the plurality of pieces of first output data and the plurality of pieces of second output data are log its or probability values that are output from the neural network.

4. The monitoring system according to claim 1, wherein the first statistical information is an arithmetic mean, a standard deviation, a median value, or a variance of the plurality of pieces of first output data.

5. The monitoring system according to claim 1, wherein the third statistical information is a mean value of the plurality of pieces of fourth statistical information.

6. The monitoring system according to claim 1, wherein the degree of change in the second statistical information with respect to the first statistical information is a Mahalanobis Distance or a Euclidean distance.

7. The monitoring system according to claim 1, wherein the processors determine there is the occurrence of the abnormality in the learning model when the degree of abnormality exceeds a threshold.

8. The monitoring system according to claim 1, wherein the plurality of pieces of first output data are output from the learning model to which the first input data is input, and
the plurality of pieces of second output data are output from the learning model to which the second input data is input.

9. A monitoring method comprising:
storing, in storage, at least a plurality of pieces of first output data that are obtained by inputting first input data in a learning model that is learned, or first statistical information that is obtained from the plurality of pieces of first output data;
training the learning model using the first input data using backpropagation;
acquiring a plurality of pieces of second output data that are obtained by inputting second input data in the learning model;
calculating a degree of abnormality indicating at least one of a degree of change in second statistical information that is obtained from the plurality of pieces of second output data with respect to the first statistical information, or another degree of change in the second statistical information with respect to third statistical information that is calculated from a plurality of pieces of fourth statistical information including the first statistical information;

determining whether or not there is an occurrence of an abnormality in the learning model, based on the degree of abnormality;

outputting information indicating the occurrence of the abnormality, in a case where the occurrence of the abnormality is determined;

extracting, in a case where the occurrence of the abnormality is determined, abnormal data that is at least one piece of the plurality of pieces of second output data that is a cause of the abnormality, among the plurality of pieces of second output data; and outputting internal information indicating how the abnormal data is processed inside the learning model, the internal information including information visualizing a relationship between a boundary between classification classes and the abnormal data.

10. A computer program product having a non-transitory computer readable medium including programmed instructions, wherein the programmed instructions, when executed by a computer, cause the computer to perform:

storing, in storage, at least a plurality of pieces of first output data that are obtained by inputting first input data in a learning model that is learned, or first statistical information that is obtained from the plurality of pieces of first output data;

training the learning model using the first input data using backpropagation;

acquiring a plurality of pieces of second output data that are obtained by inputting second input data in the learning model;

calculating a degree of abnormality indicating at least one of a degree of change in second statistical information that is obtained from the plurality of pieces of second output data with respect to the first statistical information, or another degree of change in the second statistical information with respect to third statistical information that is calculated from a plurality of pieces of fourth statistical information including the first statistical information;

determining whether or not there is an occurrence of an abnormality in the learning model, based on the degree of abnormality;

outputting information indicating the occurrence of the abnormality, in a case where the occurrence of the abnormality is determined;

extracting, in a case where the occurrence of the abnormality is determined, abnormal data that is at least one piece of the plurality of pieces of second output data that is a cause of the abnormality, among the plurality of pieces of second output data; and outputting internal information indicating how the abnormal data is processed inside the learning model, the internal information including information visualizing a relationship between a boundary between classification classes and the abnormal data.

* * * * *